E. SYPKENS.
DEVICE FOR REMOVING STALLED AUTOMOBILES.
APPLICATION FILED JULY 31, 1916.

1,241,679.

Patented Oct. 2, 1917.

Inventor
E. Sypkens

UNITED STATES PATENT OFFICE.

EDWARD SYPKENS, OF PINGREE, NORTH DAKOTA.

DEVICE FOR REMOVING STALLED AUTOMOBILES.

1,241,679.  Specification of Letters Patent.  Patented Oct. 2, 1917.

Application filed July 31, 1916.  Serial No. 112,396.

*To all whom it may concern:*

Be it known that I, EDWARD SYPKENS, a citizen of the United States, residing at Pingree, in the county of Stutsman, State of North Dakota, have invented certain new and useful Improvements in Devices for Removing Stalled Automobiles; and I do hereby declare the following to be a full, clear, and exact description of the invention, such as will enable others skilled in the art to which it appertains to make and use the same.

The present invention is directed to improvements in devices for removing stalled automobiles, and has for its object to provide a device of this character which can be conveniently carried on the automobile and readily attached to the drive wheels thereof to aid in removing the automobile from a stalled position.

A further object of the invention is to provide a device of this character which can be conveniently placed adjacent the front and rear wheels of the automobile so that when the engine is started the rear wheels will wind the device thereon so as to remove the same from a stalled position.

A still further object of the invention is to provide a device of this character which consists of a pair of belts having their adjacent ends connected by spaced straps so that the device can be readily placed in operative relation with the front and rear wheels of the automobile.

With these and other objects in view, this invention resides in the novel features of construction, formation, combination and arrangement of parts to be hereinafter more fully described, claimed and illustrated in the accompanying drawing, in which—

Figure 1:
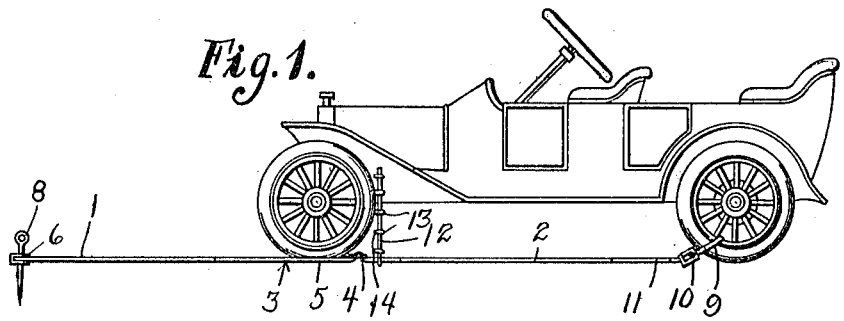
Figure 1 is a side elevation of the device showing the same in the position assumed before the engine has been started.
Figure 2:
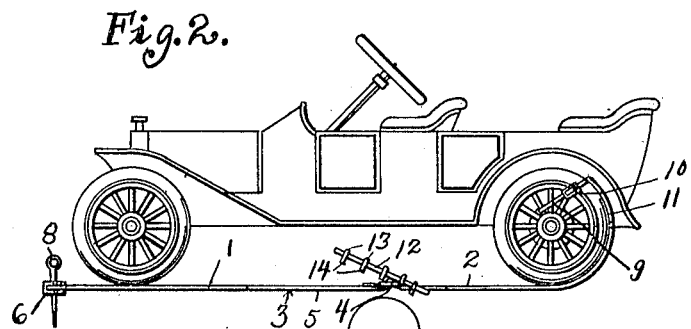
Fig. 2 is a side elevation showing the position of the device after the automobile has been moved forwardly.
Figure 3:
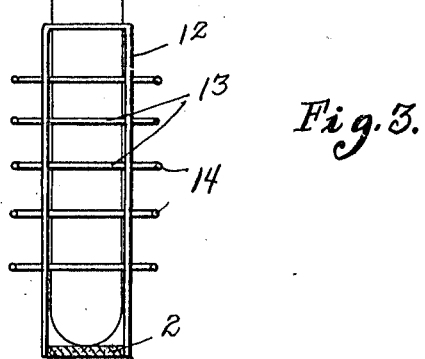
Fig. 3 is a transverse sectional view showing the yoke member in elevation.
Figure 4:
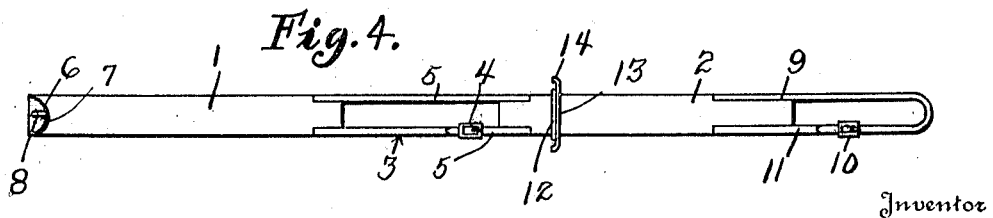
Fig. 4 is a plan view of the device.

Referring to the drawings the device consists of belts 1 and 2, said belts being preferably formed from heavy canvas, but it will be of course understood that any other material may be employed, if desired.

The rear end of the belt 1 has connected thereto a strap 3, the rear end of which is adapted to be connected by the buckles 4 carried by one of the straps 5 which are connected to the forward end of the belt 2, and since the straps 5 are arranged in spaced relation the front wheel of the automobile can engage therebetween so that the belt 1 will be in a position to permit the front wheel to pass thereover. It will be further noted that by providing these straps 3 and 5 that the device can be properly placed with relation to the automobile without the necessity of using a jack.

The forward end of the belt has connected thereto a metal clip 6, said clip having openings 7 formed therein so that the stake 8 can be engaged with the clip for anchoring the forward end of said belt.

The rear end of the belt 2 has connected thereto a strap 9 which is looped around the rim of the rear wheel and connected to the buckle 10 carried by the strap section 11, which is secured to the rear end of the belt 2.

A yoke 12 is provided and has its lower ends connected adjacent the forward end of the belt 2, said yoke having fixed thereto a plurality of transverse rods 13, said rods having hooks 14 carried by their outer ends. Since the hooks 14 extend beyond the sides of the straps 3 it is obvious that when the rear wheels wind the belt 2 thereon that the rods 13 will engage the tire of the rear wheels so that when the straps 3 and 5 approach the wheel, as the belt 2 winds thereon the hooks 14 will engage the straps 3 and 5 so as to prevent the same from moving radially of the rear wheels.

The yoke 2 is formed from metal which is sufficiently resilient so as to conform to the curvature of the rear wheel tires when the rods 13 are engaged therewith.

What is claimed is:—

A device for removing automobiles from stalled positions including a pair of belts, said belts having their adjacent ends connected by straps, means for connecting one of the belts to the rear wheel of the automobile, means for anchoring the other belt, a yoke carried by one of the belts, rods carried by the yoke, said yoke being adapted to engage the rear wheel whereby the straps will engage the rods, as and for the purpose set forth.

In testimony whereof, I affix my signature, in the presence of two witnesses.

EDWARD SYPKENS.

Witnesses:
ANDREW McKAY,
WM. SYPKENS.

Copies of this patent may be obtained for five cents each, by addressing the "Commissioner of Patents, Washington, D. C."